US012697662B2

(12) United States Patent
Frota de Souza Filho et al.

(10) Patent No.: US 12,697,662 B2
(45) Date of Patent: Aug. 4, 2026

(54) MODULAR HYDRAULIC CHUCKS

(71) Applicant: Kennametal Inc., Latrobe, PA (US)

(72) Inventors: Ruy Frota de Souza Filho, Latrobe, PA (US); Alexander Kroedel, Fuerth (DE); Kacie Watson, Alum Bank, PA (US)

(73) Assignee: KENNAMETAL INC., Latrobe, PA (US)

( * ) Notice: Subject to any disclaimer, the term of this patent is extended or adjusted under 35 U.S.C. 154(b) by 121 days.

(21) Appl. No.: 18/226,538

(22) Filed: Jul. 26, 2023

(65) Prior Publication Data

US 2025/0033123 A1      Jan. 30, 2025

(51) Int. Cl.
B23B 31/20        (2006.01)
B23B 31/30        (2006.01)
B23B 31/00        (2006.01)

(52) U.S. Cl.
CPC .......... B23B 31/204 (2013.01); B23B 31/305 (2013.01); *B23B 31/008* (2013.01); *Y10T 279/1241* (2015.01); *Y10T 279/1249* (2015.01)

(58) Field of Classification Search
CPC ... B23B 31/204; B23B 31/305; B23B 31/008; B23B 31/402; Y10T 279/1249; Y10T 279/1241; Y10T 279/1283–1291
USPC .............................. 279/4.07, 4.06, 4.11–4.12
See application file for complete search history.

(56) References Cited

U.S. PATENT DOCUMENTS

| | | |
|---|---|---|
| 1,656,624 A | 1/1928 | Eyvind |
| 2,684,854 A | 7/1954 | George et al. |
| 2,788,979 A | 4/1957 | Skillin |
| 2,958,533 A | 11/1960 | Milton et al. |
| 3,202,432 A | 8/1965 | Cameron |
| 3,592,482 A | 7/1971 | Better et al. |

(Continued)

FOREIGN PATENT DOCUMENTS

| | | |
|---|---|---|
| CN | 209754048 U | 12/2019 |
| CN | 111390215 A | 7/2020 |

(Continued)

OTHER PUBLICATIONS

Machine Translation WO 03/095132 A1, which WO '132 was published Nov. 20, 2003.*

(Continued)

*Primary Examiner* — Erica E Cadugan
(74) *Attorney, Agent, or Firm* — Christopher J. Owens

(57)        ABSTRACT

Hydraulic chuck assemblies for receiving tool shanks are disclosed. The hydraulic chuck assembly comprises a tool support member, a clamping tube, and an expansion sleeve. The clamping tube may be integral to or separate from and attached to the tool support member. The clamping tube comprises slots on the radial outer surface to provide torque transfer. The expansion sleeve comprises a generally cylindrical body, an integral flange, and a torque transfer projection. The torque transfer projection extends radially outward from the outer wall of the body below the integral flange. The expansion sleeve further comprises a pressure chamber in fluid communication with a pressurized fluid system in the tool support member. During operation, a pressure adjustment screw in the tool support member communicates with the pressurized fluid chamber of the expansion sleeve to clamp a tool shank.

19 Claims, 12 Drawing Sheets

(56)                    References Cited

U.S. PATENT DOCUMENTS

| | | | |
|---|---|---|---|
| 4,349,207 | A | 9/1982 | Fink |
| 4,387,906 | A | 6/1983 | Nicolin |
| 4,411,568 | A | 10/1983 | Rohm |
| 4,580,796 | A | 4/1986 | Baur et al. |
| 4,844,489 | A | 7/1989 | Acker, III et al. |
| 5,067,861 | A * | 11/1991 | Danielsen ............. B23B 31/305 |
| | | | 408/239 R |
| 5,127,780 | A | 7/1992 | Massa |
| 5,551,710 | A | 9/1996 | Bruchman |
| 5,906,378 | A | 5/1999 | Nordquist |
| 6,311,987 | B1 | 11/2001 | Rinne et al. |
| 6,473,954 | B1 | 11/2002 | Rosberg et al. |
| 6,641,128 | B2 | 11/2003 | Fries |
| 2001/0026050 | A1 | 10/2001 | Barbieux |
| 2005/0280216 | A1 | 12/2005 | Han |
| 2007/0090611 | A1 | 4/2007 | Soroka et al. |
| 2007/0145692 | A1 | 6/2007 | Herud |
| 2007/0216113 | A1* | 9/2007 | Schuster ............... B23B 31/402 |
| | | | 279/2.08 |
| 2011/0057397 | A1 | 3/2011 | Timtner et al. |
| 2013/0292913 | A1 | 11/2013 | Teusch |
| 2014/0197607 | A1 | 7/2014 | Doi |
| 2016/0368064 | A1 | 12/2016 | Boregowda et al. |
| 2018/0369931 | A1 | 12/2018 | Boregowda et al. |
| 2019/0001420 | A1 | 1/2019 | Teusch et al. |
| 2019/0168311 | A1 | 6/2019 | Haimer |
| 2020/0276654 | A1 | 9/2020 | Chen |
| 2021/0252609 | A1 | 8/2021 | Schäperkötter et al. |
| 2022/0152709 | A1 | 5/2022 | Herzog et al. |
| 2023/0356304 | A1* | 11/2023 | Retzbach .............. B23B 31/305 |

FOREIGN PATENT DOCUMENTS

| | | | |
|---|---|---|---|
| DE | 2530993 | A1 | 1/1977 |
| DE | 3213483 | A | 10/1983 |
| DE | 102010008872 | A1 | 8/2011 |
| DE | 102012215036 | A1 | 10/2013 |
| DE | 102015122763 | A1 | 8/2016 |
| DE | 102015120971 | A1 | 6/2017 |
| DE | 102016116164 | A1 | 3/2018 |
| DE | 102020117384 | A1 | 1/2022 |
| EP | 3815822 | A1 | 5/2021 |
| JP | 2020138310 | A | 9/2020 |
| TW | 131396 | Y | 3/1990 |
| WO | WO-03/095132 | A1 * | 11/2003 |
| WO | 2008054295 | A1 | 5/2008 |
| WO | 2017064332 | A1 | 4/2017 |
| WO | 2022091521 | A1 | 5/2022 |

OTHER PUBLICATIONS

Oct. 9, 2025 Foreign Office Action German Application No. DE102024207037.8, 08 Pages.
Feb. 6, 2026 Notice of Allowance for U.S. Appl. No. 18/359,381, 11 Pages.

* cited by examiner

MODULAR HYDRAULIC CHUCKS

FIELD OF THE INVENTION

The present invention relates to hydraulic chucks, and more particularly relates to modular hydraulic chucks.

BACKGROUND OF THE INVENTION

Chucks are designed to securely hold objects, such as tool shanks. A hydraulic chuck comprises a tool support member comprising a central cylindrical bore designed to clamp a tool shank. An expansion sleeve designed to hold tool shanks is soldered to the tool support member. The sleeve comprises a pressure chamber comprising a hydraulic fluid, such as oil. A pressurized member, such as a screw, communicates with the oil to pressurize the oil when the screw is advanced. When the oil is pressurized, the sleeve clamps a tool shank. Over time, the pressure creates cracks in soldering, causing catastrophic failure of tools.

SUMMARY OF THE INVENTION

The present invention provides hydraulic chuck assemblies for receiving tool shanks. The hydraulic chuck assembly comprises a tool support member, an internal clamping tube, and an expansion sleeve. The clamping tube may be integral to the tool support member or separate and attached to the tool support member. The clamping tube may comprise captive slots and open slots on a radial outer surface to help provide torque transfer to the tool shank. The expansion sleeve may comprise a generally cylindrical body, an integral flange, and a torque transfer projection. The integral flange may extend radially outward from the outer wall of the body and may comprise attachment screw bores structured and arranged to receive attachment screws to fasten the integral flange to a tool support member. The torque transfer projection may extend radially outward from an outer wall of the body below the integral flange. The expansion sleeve may comprise a pressure chamber in fluid communication with a pressurized fluid system in the tool support member. During operation, a pressure adjustment screw in the tool support member may communicate with the pressurized fluid chamber of the expansion sleeve to clamp a tool shank.

An aspect of the present invention is to provide a modular hydraulic chuck assembly comprising: (a) a tool support member; (b) a hydraulic expansion sleeve extending axially forward from the tool support member comprising a central bore; and (c) a cylindrical inner clamping tube extending axially forward from the tool support member disposed at least partially within the central bore of the expansion sleeve.

This and other aspects of the present invention will be more apparent from the following description.

DETAILED DESCRIPTION

Figure 1:
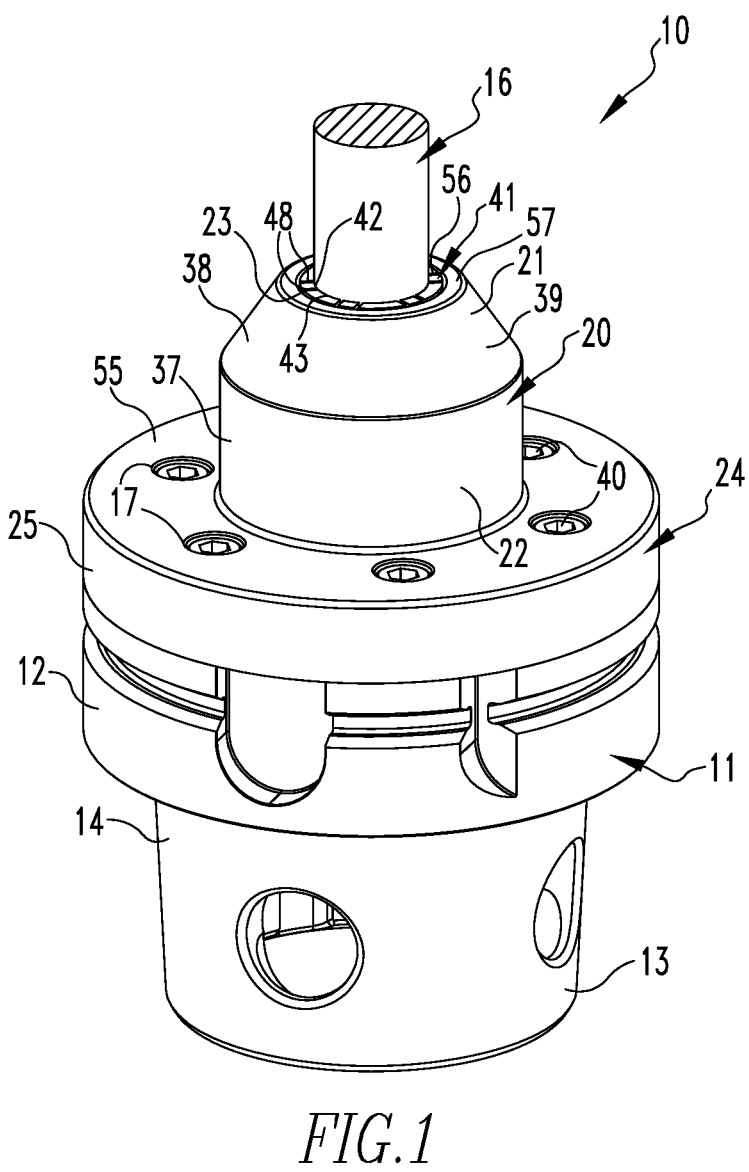
FIG. 1 is an isometric view of a hydraulic chuck assembly including a tool support member, expansion sleeve, and inner clamping tube in accordance with an embodiment of the present invention.
Figure 2:
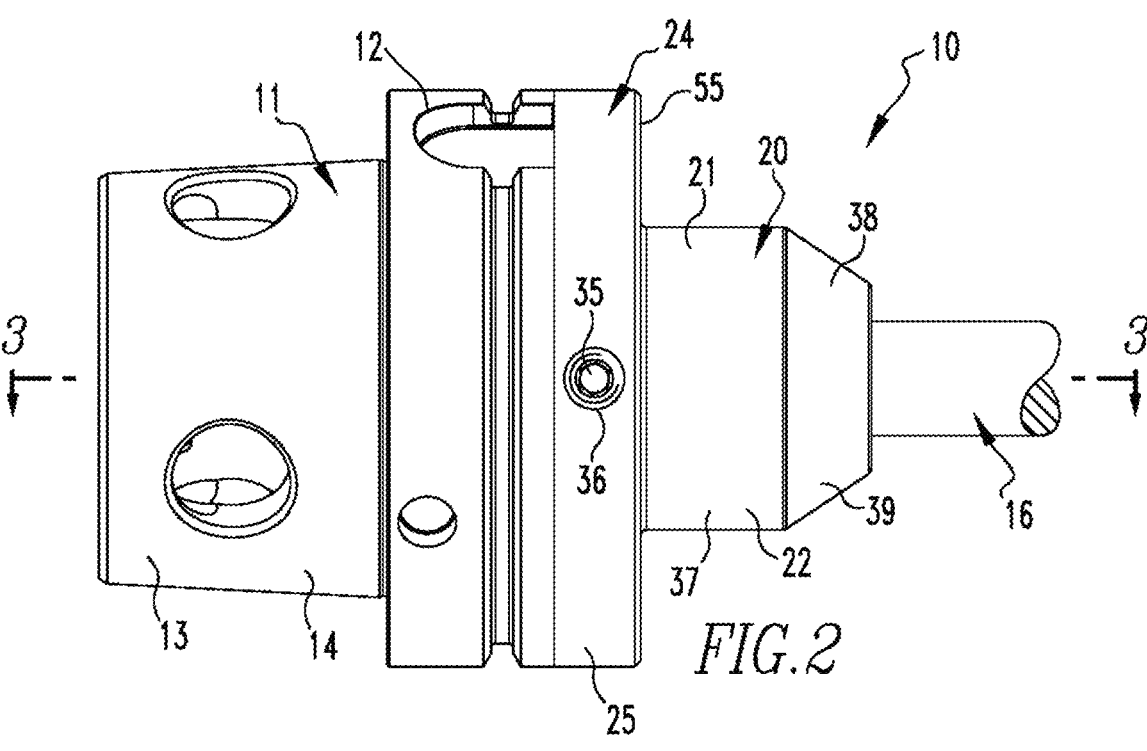
FIG. 2 is a side view of the hydraulic chuck assembly of FIG. 1.

FIGS. 1 to 5 illustrate a hydraulic chuck assembly 10 in accordance with an embodiment of the present invention. The hydraulic chuck assembly 10 includes a tool support member 11 comprising a cylindrical body 14. The body 14 of the tool support member 11 comprises a front end 12 and a machine tool rear end 13. The body 14 of the tool support member 11 defines attachment screw bores 15 on the front end 12 structured and arranged to receive attachment screws 40 to attach the expansion sleeve 20. The hydraulic chuck assembly 10 also includes a modular expansion sleeve 20 comprising a body 21 and an integral flange 24. The expansion sleeve 20 comprises an axial rearward end 37 and an axial forward end 38. The integral flange 24 comprises a front face 55, a rear face 26, and a radial outer surface 25. The integral flange 24 defines attachment screw bores 17 that communicate with attachment screw bores 15 on the tool support member 11. Attachment screws 40 are inserted into the attachment screw bores 15 and 17 to secure the expansion sleeve 20 to the tool support member 11. While threaded screws 40 are used to attach the expansion sleeve 20 to the tool support member 11 in the embodiment illustrated in FIGS. 1 to 5, any other means of attachment known to one skilled in the art may be used. For example, the expansion sleeve may be attached to the tool support member with other types of mechanical fasteners, brazing, shrink fitting, or combinations thereof.

The body 21 of the expansion sleeve 20 comprises a radial outer surface 22, a tapered outer surface 39, and a radial inner surface 23. The radial outer surface 22 extends axially forward from the front face 55 of the integral flange 24 toward the axial forward end 38 of the expansion sleeve 20. The radial outer surface 22 connects to the tapered outer surface 39, which extends radially inward at a taper angle from the radial outer surface 22 toward the axial forward end 38 of the expansion sleeve 20. The tapered outer surface 39 may have a taper angle of at least 1°, such as at least 5°, such as at least 15°. The tapered outer surface 39 may have a taper angle measured from a longitudinal axis of the expansion sleeve 20 of up to 60°, such as up to 30°, such as up to 20°. The tapered outer surface 39 may have a taper angle of from 1° to 60°, such as from 5° to 45°, such as from 15° to 30°. In other embodiments, the expansion sleeve does not comprise a tapered outer surface.

The inner surface 23 of the expansion sleeve 20 defines a central bore 49 along the longitudinal axis. The integral flange 24 extends outwardly from the radial outer surface 22 toward the axial rearward end 37 of the expansion sleeve 20. As used herein, the terms "integral" and "integrally formed," mean that two portions or components are fabricated as a single unitary piece and without being produced from separate parts that are subsequently joined together by methods such as welding, brazing, mechanical fastening, or the like. The components may be produced together at the same time as a unitary structure by any suitable process such as additive manufacturing, lost wax casting, and the like.

A non-cylindrical torque transfer projection 28 extends axially rearward from the rear face 26 of the integral flange 24 to a rear edge 27. As shown in FIG. 4, the torque transfer projection 28 comprises an outer surface 54 and is received in the torque transfer recess 50 of the tool support member 11. The torque transfer projection 28 also includes an internal circumference 28a that is contiguous with the central bore 49 of the expansion sleeve 20, as can be seen in at least FIGS. 3-4. In the embodiment shown, the torque transfer projection 28 and torque transfer recess 50 are hexagonal shaped. However, any other shapes having non-circular cross-sections may be used. The torque transfer recess 50 has an inner surface 51, a front face 52, and a bottom 53. The outer surface 54 of the torque transfer projection 28 contacts the inner surface 51 of the torque transfer recess 50, and the front face 52 of the torque transfer recess 50 may contact the rear edge 27 of the torque transfer projection 28. The bottom 53 of the torque transfer recess 50 is located toward the machine-tool rear end 13 of the tool support member 11. While in the embodiment shown the torque transfer projection is located on the expansion sleeve, and the torque transfer bore is located on the body of the tool support member, in other embodiments the torque transfer projection may be located on the tool support member and the torque transfer bore may be located on the expansion sleeve. In still other embodiments, the hydraulic chuck assembly may not comprise torque transfer projections recess as shown, but include other forms of torque transfer components, such as pins and the like.

An internal pressure chamber 29 may be located between the outer radial surface 22 and/or the outer tapered surface 39 and the inner surface 23 of the expansion sleeve 20. The pressure chamber 29 has a generally cylindrical outer radial wall 30 and a generally cylindrical inner radial wall 31. The internal pressure chamber 29 provides an elastic wall that allows the inner surface 23 of the expansion sleeve 20 to press radially inward against a radial outer surface 44 of the cylindrical clamping tube 41, as more fully described below. In the embodiment shown, the pressure chamber 29 has a front expansion band 32 and a rear expansion band 33. The inner radial wall 31 forms a raised midsection 34 between the front expansion band 32 and the rear expansion band 33.

Figure 3:
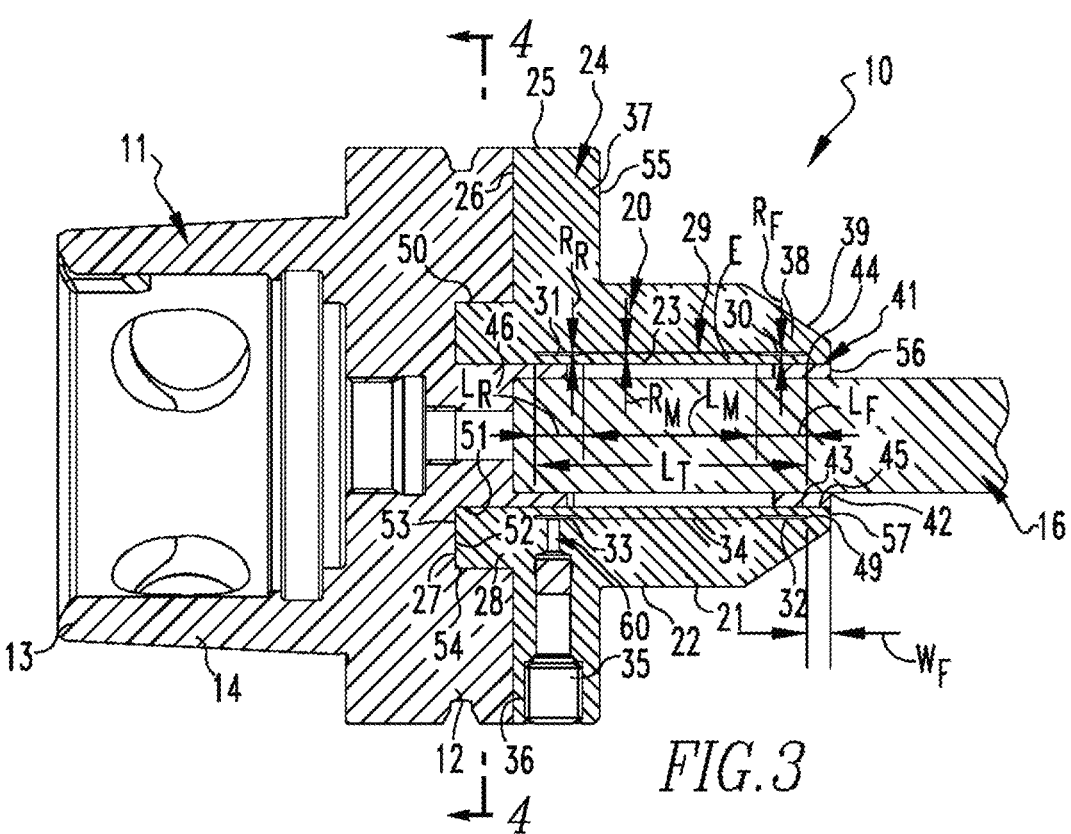
FIG. 3 is a side sectional view taken through line 3-3 of FIG. 2.
Figure 4:
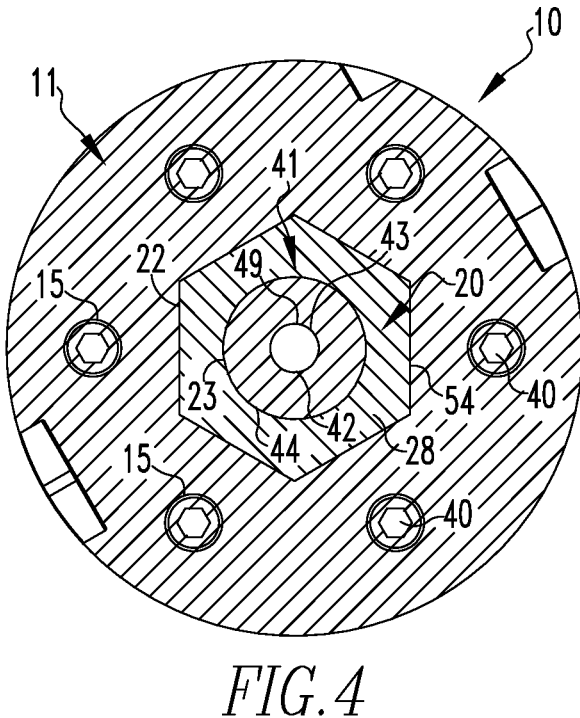
FIG. 4 is a cross sectional view taken through line 4-4 of FIG. 3.
Figure 5:
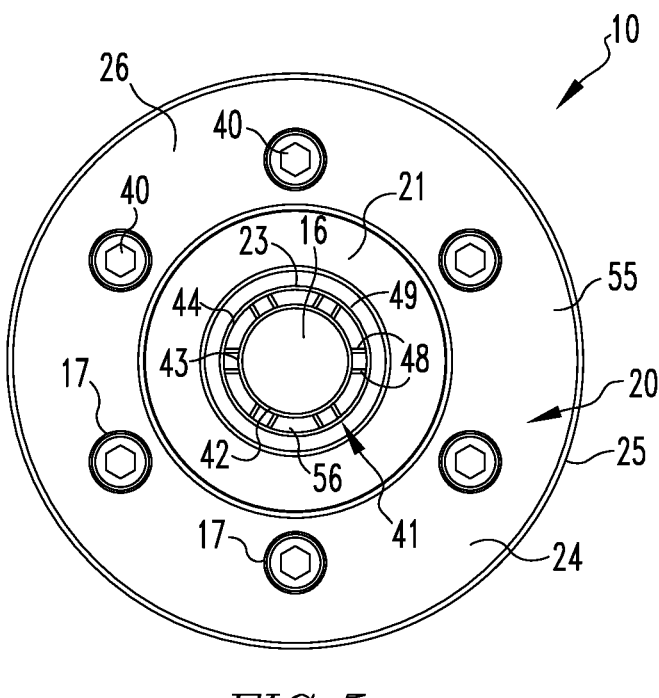
FIG. 5 is a front end view of the hydraulic chuck assembly of FIGS. 1 to 4.
Figure 6:
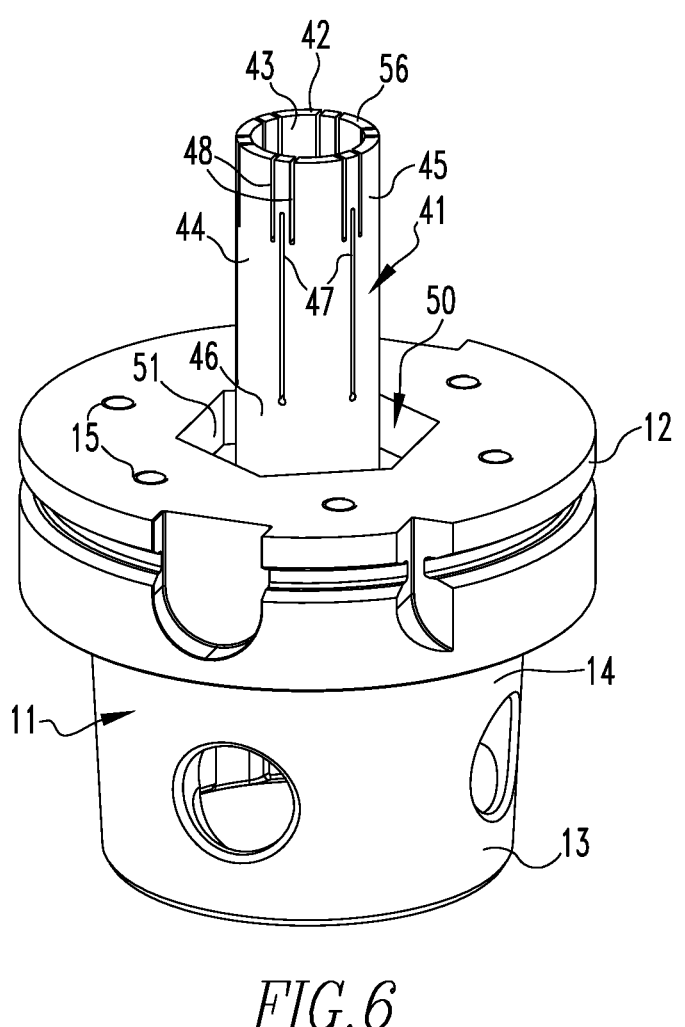
FIG. 6 is an isometric view of a tool support member and integral clamping tube according to an embodiment of the present invention, corresponding to the hydraulic chuck assembly of FIGS. 1-5.
Figure 7:
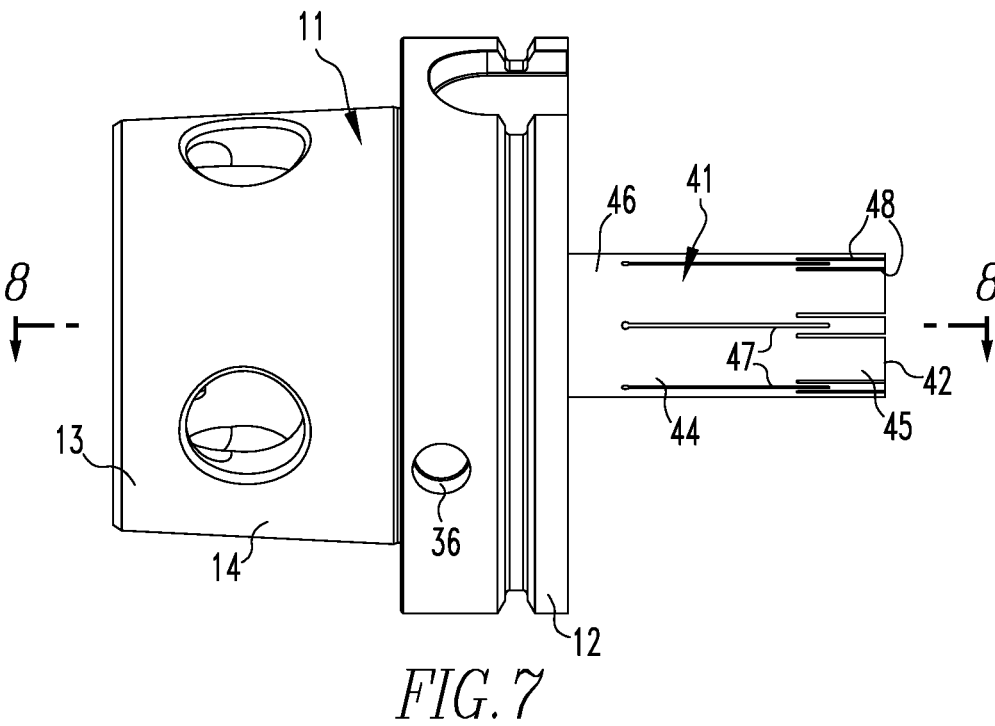
FIG. 7 is a side view of the tool support member of FIG. 6.
Figure 8:
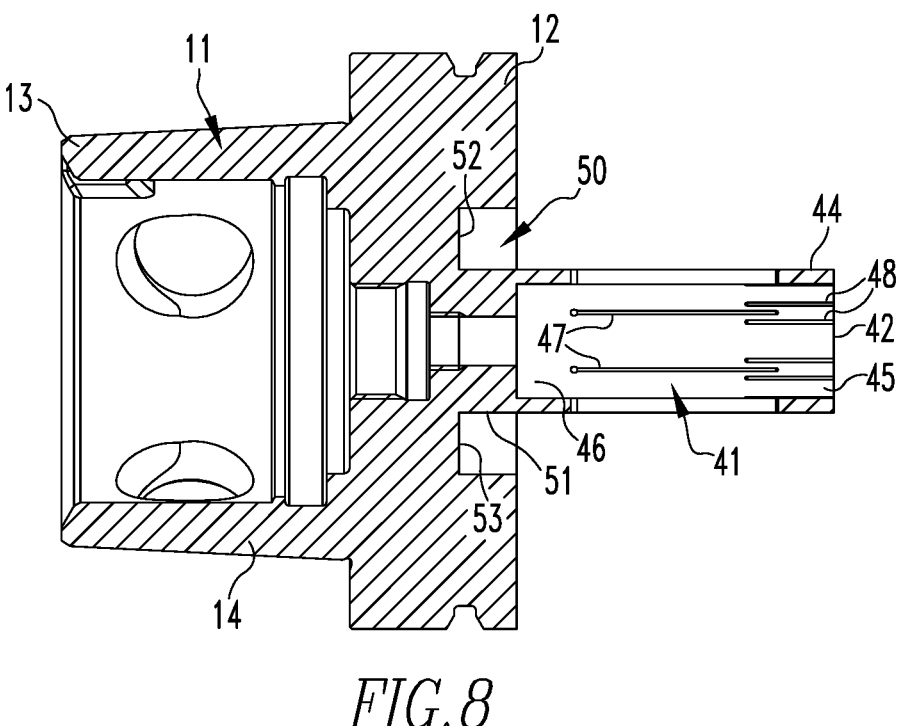
FIG. 8 is a side sectional view taken through line 8-8 of FIG. 7.
Figure 9:
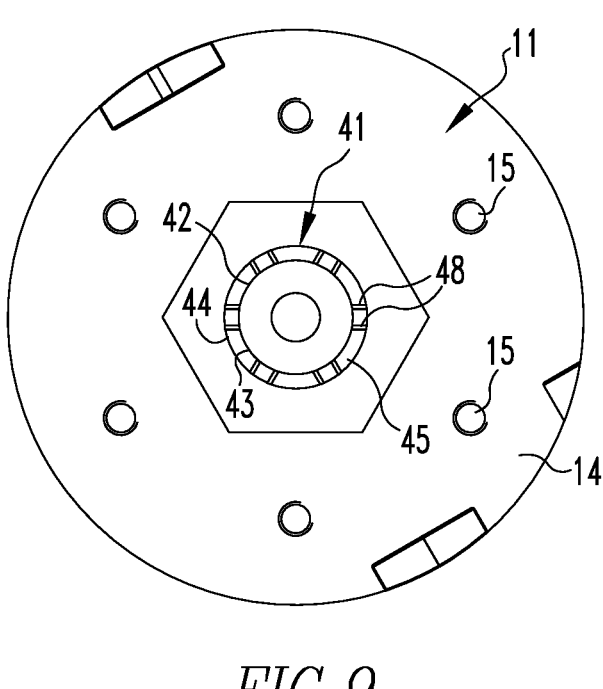
FIG. 9 is a front end view of the tool support member of FIGS. 6 to 8.
Figure 10:
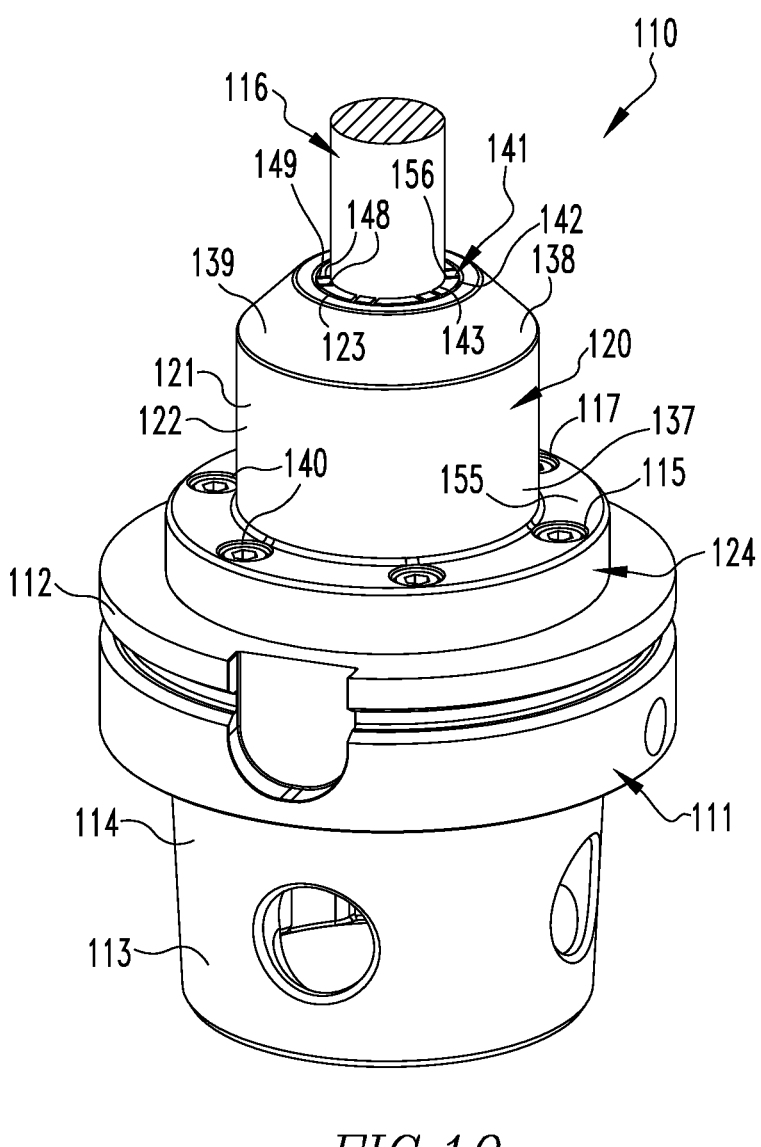
FIG. 10 is an isometric view of a hydraulic chuck assembly according to an embodiment of the present invention.
Figure 11:
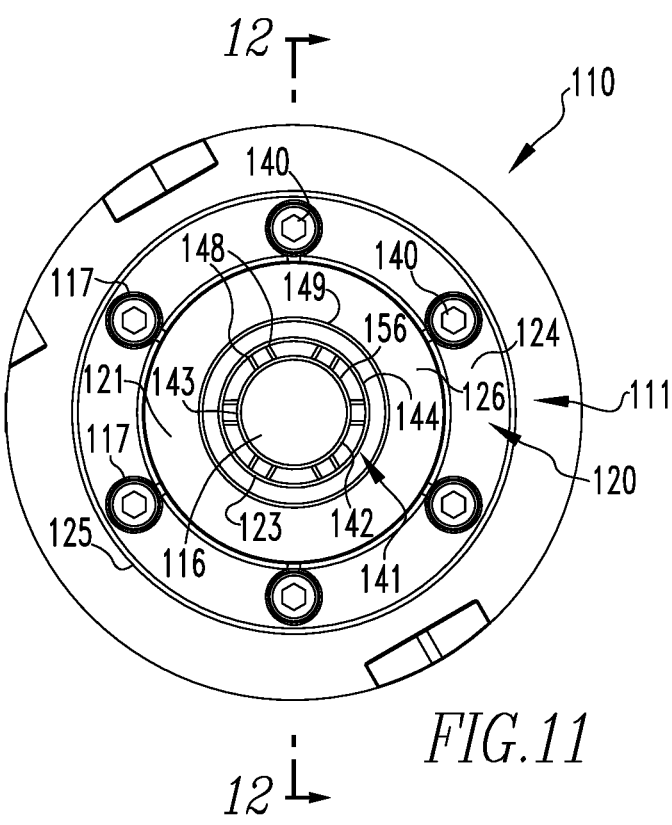
FIG. 11 is a front end view of the hydraulic chuck assembly of FIG. 10.
Figure 12:
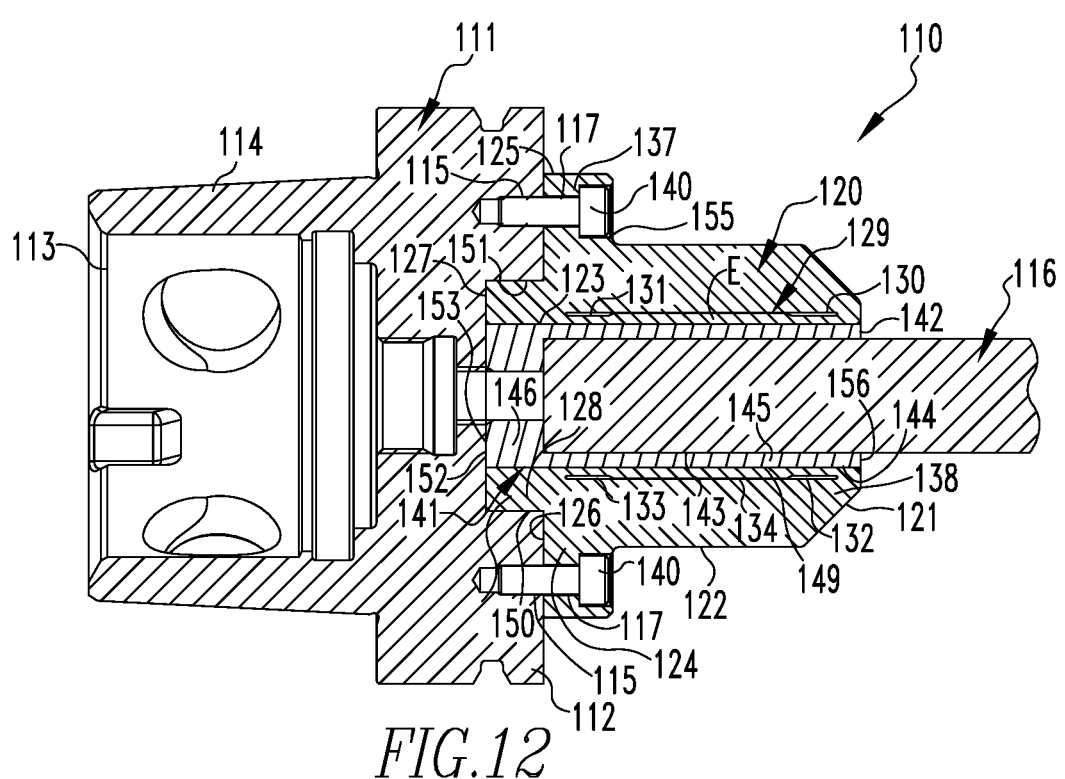
FIG. 12 is a side sectional view taken through line 12-12 of FIG. 11.

As shown in FIG. 3, the pressure chamber 29 has a total axial length $L_T$. In the embodiment shown, the front expansion band 32 has an axial length $L_F$ and a radial width $R_F$, the rear expansion band 33 has an axial length $L_R$ and a radial width $R_R$, and the raised midsection 34 has an axial length $L_M$ and a radial width $R_M$. The relatively thin expansion bands 32 and 33 are able to deform to a greater extent than the thicker midsection 34 when the internal pressure chamber 29 is pressurized by hydraulic fluid. This causes the midsection to flex inwardly and provide increased clamping force on a tool shank in the midsection region. The raised midsection 34 can be relatively long because the integrally formed outer and inner walls 30 and 31 are made of a single unitary piece of material and no braze or other type of joint is required in communication with or adjacent to the pressure chamber 29. The lengths of the expansion bands 32 and 33 may be minimized so that the majority of the length of the pressure chamber at the midsection 34 provides clamping force on the tool shank, thus improving clamp stability.

As shown in FIG. 3, the length of the midsection $L_M$ may be greater than the length of the rear expansion band $L_R$, or may be greater than the length of the front section $L_F$, or may be greater than the combined lengths of $L_R$ and $L_F$. For example, the ratio of $L_M$:$L_R$ may be from 1.5:1 to 20:1, or from 2:1 to 10:1. The ratio of $L_M$:$L_F$ may be from 1.5:1 to 20:1, or from 2:1 to 10:1. The ratio of $L_R$:$L_F$ may be from 0.5:1 to 2:1, or from 0.8:1 to 1.2:1. The ratio of $L_M$:$L_T$ may be from 0.2:1 to 1:1, or from 0.3:1, to 0.95:1, or from 0.4:1 to 0.8:1.

The radial widths $R_F$ and $R_R$ of the front expansion band 32 and the rear expansion band 33, respectively, may be from zero to 1,000 percent greater than the radial width $R_M$ of the raised midsection 34, for example, from 50 to 500 percent greater, or from 100 to 300 percent greater. $R_F$ and $R_R$ may typically be from 0.1 to 2 mm, for example from 0.2 to 1.5 mm, or from 0.3 to 1.0 mm, or from 0.4 to 0.6 mm. $R_M$ may typically be from 0.01 to 0.1 mm, for example from 0.02 to 0.08 mm, or from 0.04 to 0.06 mm.

As further shown in FIG. 3, the front section 32 of the pressure chamber 29 terminates at a location relatively close to the front edge 57 of the expansion sleeve 20, defining a face width $W_F$ measured in the direction of the longitudinal axis. The face width $W_F$ may typically be from 0.5 to 6 mm, for example from 0.8 to 5 mm, or from 1 to 4 mm. In certain embodiments, the face width $W_F$ may be less than 5 mm, or less than 4 mm, or less than 3 mm, or less than 2 mm, or less than 1 mm.

The ratio of the face width to radial width $W_F$:$R_F$ may typically range from 1:1 to 20:1, or from 1.5:1 to 15:1, or from 2:1 to 10:1. The ratio of $W_F$:$L_T$ may typically range from 0.005:1 to 0.5:1, or from 0.01:1 to 0.2:1, or from 0.02:1 to 0.1:1.

The elastic wall is provided between the inner radial wall 31 of the pressure chamber 29 and the inner surface 23 of the expansion sleeve 20 presses radially inwardly elastically when high pressure builds up in the pressure chamber 29, thus clamping a tool shaft. The thickness of the elastic wall may be measured from the outer radial wall 30 of the midsection 34 of the pressure chamber or from the outer radial wall 30 of one of the expansion bands 32 and 33. The elastic wall may have a thickness of at least 0.5 mm, such as at least 0.75 mm, such as at least 1 mm. The elastic wall may have a thickness of no more than 5 mm, such as no more than 4 mm, such as no more than 3 mm. The elastic wall may have a thickness of from 0.5 mm to 5 mm, such as from 0.75 mm to 4 mm, such as from 1 mm to 3 mm.

A pressurized fluid system 60 in the tool support member 11 supplies hydraulic fluid to the pressure chamber 29 in the expansion sleeve 20. Hydraulic fluid may be introduced into the pressurized fluid system 60 through a pressurized fluid fill port into a pressurized fluid supply inlet. The hydraulic fluid then travels from the pressurized fluid supply inlet through the pressurized fluid system to the pressure chamber 29. A pressure adjustment bore 36 is in communication with the pressurized fluid system 60. A pressure adjustment screw 35 is inserted into the pressure adjustment bore 36. The pressure adjustment screw 35 regulates the pressure in the pressure chamber. When the screw is tightened, high pressure builds up in the pressure chamber 29. As a result of this pressure, the expansion sleeve 20 is actuated inwardly elastically in a radial direction for chucking a tool. Although the internal pressure chamber 29 is provided in the expansion sleeve in the embodiment shown, the pressure chamber may alternatively be provided in the clamping tube in addition to, or in place of, the pressure chamber.

In the embodiment shown in FIGS. 1-9, the hydraulic chuck assembly 10 includes an integral cylindrical clamping tube 41 extending axially forward along the longitudinal axis from the front end 12 of the tool support member 11 through the central bore 49 of the expansion sleeve 20. The clamping tube 41 may be integrally formed with the tool support member 11 by fabrication methods including additive manufacturing, casting, and/or machining. The clamping tube 41 comprises a tool receptacle front end 45 and a rearward end 46, which define an axial length of the clamping tube. The clamping tube has a radial outer surface 44, a clamping inner surface 43, and a front edge 56. The clamping inner surface 43 defines a central bore 42 structured and arranged to receive a tool shaft 16 at the tool receptacle front end 45. In the illustrated embodiment, the clamping tube 41 is integrally formed with the tool support member 11.

The axial length of the clamping tube 41 may be at least 20 percent of the axial length $L_T$ of the pressure chamber 29, such as at least 50 percent, such as at least 75 percent. The axial length of the clamping tube 41 may be no more than 500 percent of the axial length $L_T$ of the pressure chamber 29, such as no more than 200 percent, such as no more than 150 percent. The axial length of the clamping tube 41 may be from 20 to 500 percent of the axial length $L_T$ of the pressure chamber 29, such as from 50 to 200, such as from 75 to 150.

The clamping tube 41 has a wall thickness of at least 0.25 mm, such as at least 1 mm, such as at least 2 mm. The clamping tube 41 has a wall thickness of no more than 5 mm, such as no more than 4 mm, such as no more than 3 mm. The clamping tube 41 has a wall thickness of from 0.3 mm to 5 mm, such as from 1 mm to 4 mm, such as from 2 mm to 3 mm.

The ratio of the elastic wall thickness to the clamping tube 41 wall thickness may be at least 0.1:1, such as at least 1:2, such as at least 1:1. The ratio of the elastic wall thickness to the clamping tube 41 wall thickness may be no more than 10:1, such as no more than 5:1, such as no more than 2:1. The ratio of the pressure chamber 29 wall thickness to the clamping tube 41 wall thickness may be from 0.1:1 to 10:1, such as from 1:2 to 5:1, such as from 1:1 to 2:1.

In some embodiments, the expansion sleeve 20 and/or the clamping tube 41 may be made of a harder material than the tool support member 11, such as carbide steel. The tool support member 11 may typically be made of, for example, steel or suitable like materials. The harder material of the expansion sleeve 20 and/or the clamping tube 41 may provide increased stiffness and hardness, thus making the system more wear-resistant.

FIGS. 6 to 9 illustrate the tool support member 11 with the integrally formed clamping tube 41 illustrated in the hydraulic chuck assembly of FIGS. 1 to 5. The clamping tube 41 has captive slots 47 and open slots 48 extending in an axial direction on the outer surface 44 of the clamping tube 41. The open slots 48 extend through the front edge 56 of the clamping tube 41 and terminate midway down the outer surface 44 of the tube 41. As previously stated herein, the relatively thin recessed front section 32 and rear section 33 are able to deform when the pressure chamber 29 is pressurized by the hydraulic fluid. The slots allow the clamping tube to flex inwardly in response to the pressure exerted by the pressure chamber on the clamping tube, which results in greater clamping force of the tool at the tool receptacle front end 45 of the clamping tube 41. The slots further allow for cooling of the hydraulic chuck assembly 10 when operating.

The captive slots 47 extend in an axial direction and terminate short of the front edge 56 of the clamping tube 41. The captive slots 47 extend further than the open slots 48 but terminate short of a rear edge of the clamping tube 41. The slots 47 and 48 may be equally spaced and positioned around the circumference of the clamping tube 41. The clamping tube 41 may comprise at least one open slot 47, such as at least two, such as at least three, such as at least four. The clamping tube 41 may comprise no more than twenty open slots 47, such as no more than twelve, such as no more than ten, such as no more than eight. The clamping tube 41 may comprise from one to twenty open slots 47, such as from two to twelve, such as from three to ten, such as from four to eight. The clamping tube 41 may comprise at least two captive slots 48, such as at least four, such as at least six, such as at least eight. The clamping tube 41 may comprise no more than forty captive slots 48, such as no more than twenty-four, such as no more than twenty, such as no more than sixteen. The clamping tube 41 may comprise from two to forty captive slots 48, such as from four to twenty-four, such as from six to twenty, such as from eight to sixteen. The ratio of open slots 47 to captive slots 48 may be at least 1:4, such as at least 1:3, such as at least 1:2, such as at least 1:1. The ratio of open slots 47 to captive slots 48 may be no more than 4:1, such as no more than 3:1, such as no more than 2:1. The ratio of open slots to captive slots may be from 1:4 to 4:1, such as from 1:3 to 3:1, such as from 1:2 to 2:1, such as from 1:1 to 2:1. The ratio of open slots to captive slots may be 2:1.

FIGS. 10 to 15 illustrate a hydraulic chuck assembly 110 in accordance with another embodiment of the present invention. The hydraulic chuck assembly 110 includes several features similar to the hydraulic chuck assembly 10. Features common to the embodiments described herein are labeled with corresponding element numbers. The hydraulic chuck assembly 110 comprises a modular expansion sleeve 120, a cylindrical modular clamping tube 141, and a tool support member 111.

The modular clamping tube 141 is provided as a separate piece from the tool support member 111, i.e., the components are not integrally formed. The modular clamping tube 141 and tool support member 111 may be fastened or joined together by welding, brazing, mechanical fastening, press filling, and the like. The tool support member 111 comprises a cylindrical body 114. The body 114 of the tool support member 111 comprises a front end 112 and a machine tool rear end 113. The modular clamping tube 141 is separate and attached to the tool support member 111. A tool shaft 116 extends from a tool holder receptacle opening 142 of the modular clamping tube 141. The expansion sleeve 120 has an axial rearward end 137 and an axial forward end 138. The expansion sleeve 120 comprises a body 121 and an integral flange 124. The body 121 comprises a radial outer surface 122, a tapered outer surface 139, and a radial inner surface 123. The integral flange 124 comprises a front face 155. Attachment screws 140 are inserted in attachment screw bores 115 and 117 that extend through the integral flange 124. A non-cylindrical torque transfer projection 128 extends axially rearward from the rear face 126 of the integral flange 124 to a rear edge 127 of the torque transfer projection 128. The torque transfer projection 128 comprises an outer surface 154 and is received in the torque transfer recess 150 of the tool support member 111. The torque transfer recess 150 has an inner surface 151, a front face 152, and a bottom 153.

The modular clamping tube 141 comprises a tool receptacle front end 145 and a rearward end 146. The modular clamping tube 141 has a radial outer surface 144 and a clamping inner surface 143 that defines a tool holder receptacle opening 142. Open slots 148 extend in an axial direction on the outer surface 144 of the modular clamping tube 141 to a front edge 156 of the tube 141.

Figure 13:
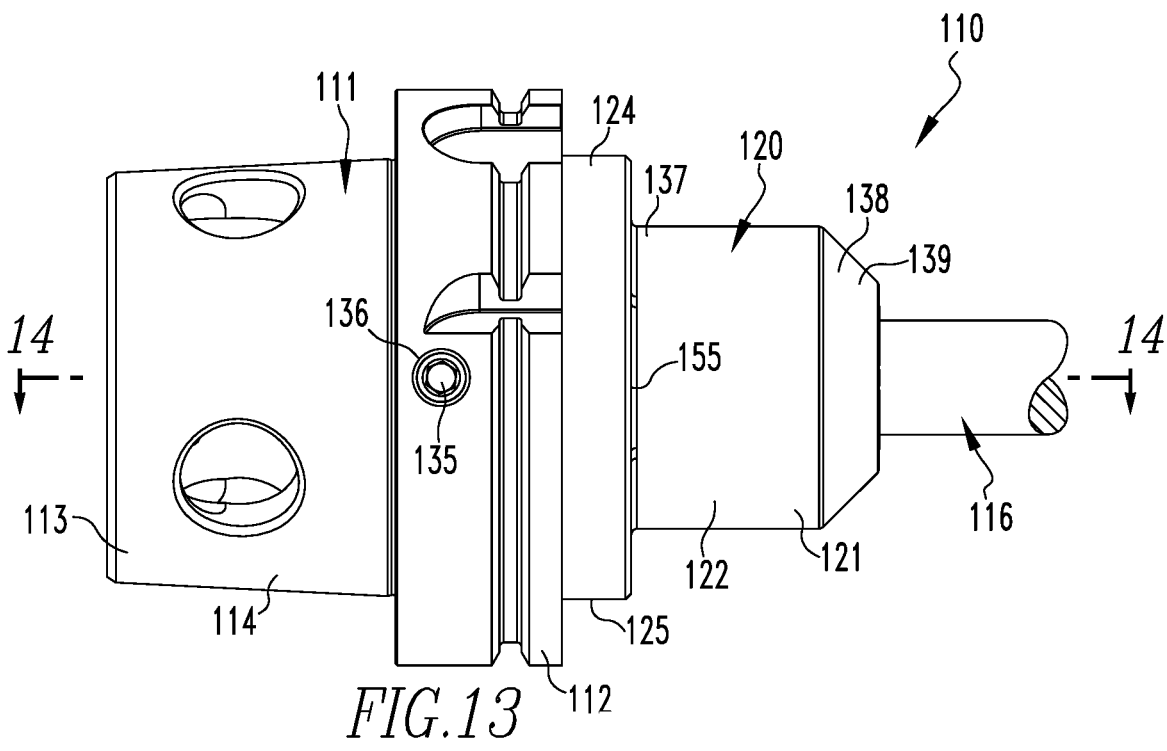
FIG. 13 is a side view of the hydraulic chuck assembly of FIGS. 10 to 12.
Figure 14:
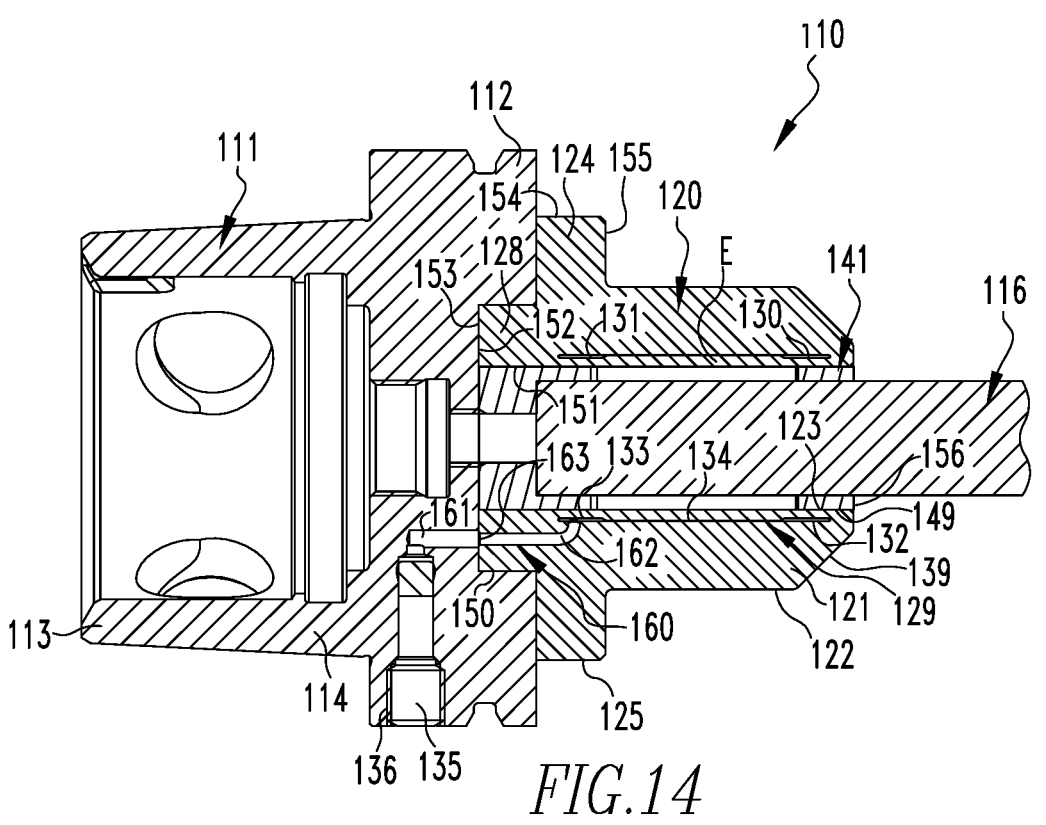
FIG. 14 is a side sectional view taken through line 14-14 of FIG. 13.
Figure 15:
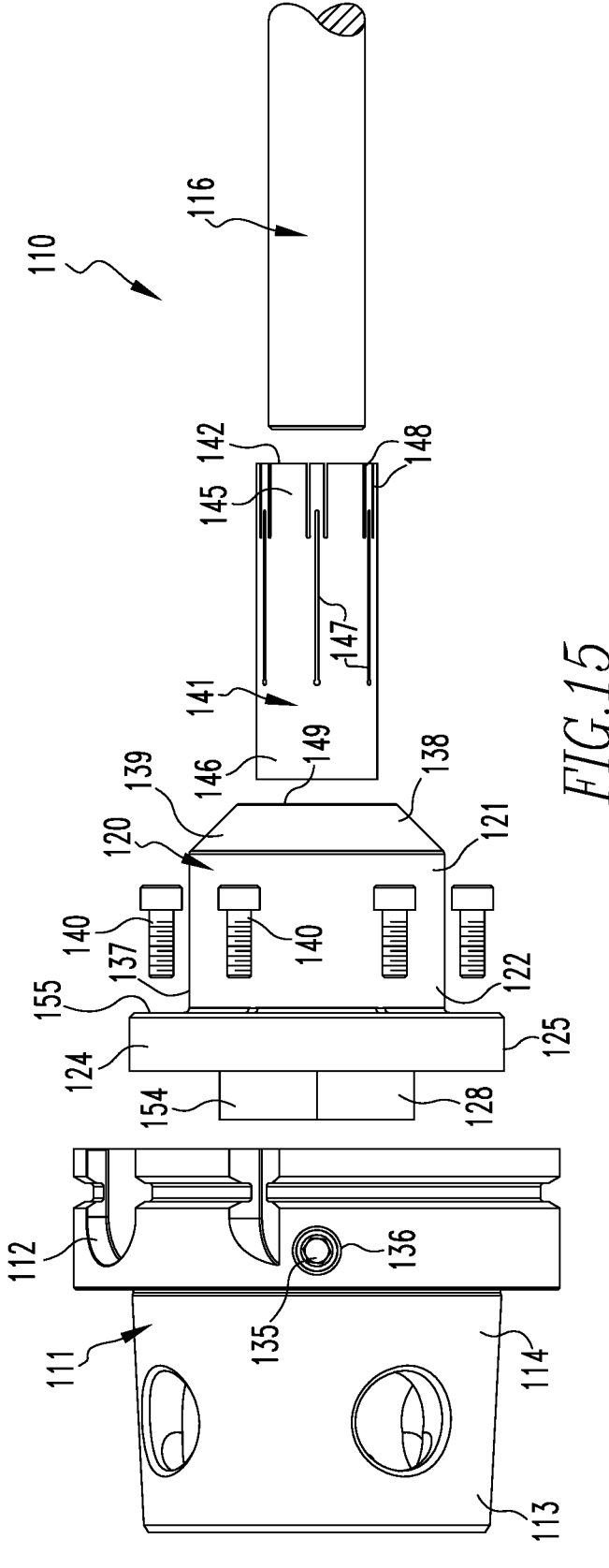
FIG. 15 is an exploded side view of the hydraulic chuck assembly of FIGS. 10 to 14.

FIG. 14 illustrates the pressurized fluid system 160 of the hydraulic chuck assembly 110 of FIGS. 13 and 14. The pressurized fluid system 160 comprises the pressure chamber 129 located between the outer surfaces 122 and 139 and inner surface 123 of the expansion sleeve 120. The pressure chamber 129 has a generally cylindrical outer radial wall 130 and a generally cylindrical inner radial wall 131. In the embodiment shown, the pressure chamber 129 has a front expansion band 132 and a rear expansion band 133. The inner radial wall 131 forms a raised midsection 134 between the front expansion band 132 and the rear expansion band 133. Hydraulic fluid may be introduced through the pressurized fluid supply inlet 161, which is in fluid communication with the pressurized fluid line 162 through the pressurized fluid port 163 that extends through the bottom 153 of the torque transfer recess 150. The pressurized fluid line 162 is in fluid communication with the pressure chamber 129. A pressure adjustment bore 136 is in communication with the pressurized fluid system 160. As explained in more detail herein in reference to the first embodiment, a pressure adjustment screw 135 is inserted into the pressure adjustment bore 136 and is used to regulate the pressure in the pressure chamber 129.

Figure 16:
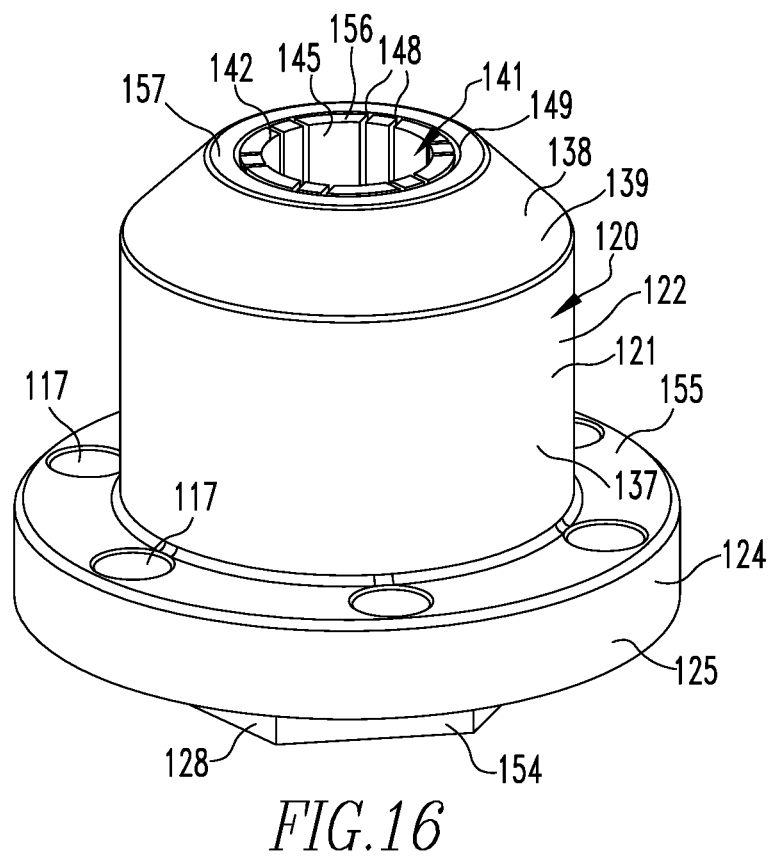
FIG. 16 is an isometric view of an expansion sleeve and clamping tube according to an embodiment of the present invention.
Figure 17:
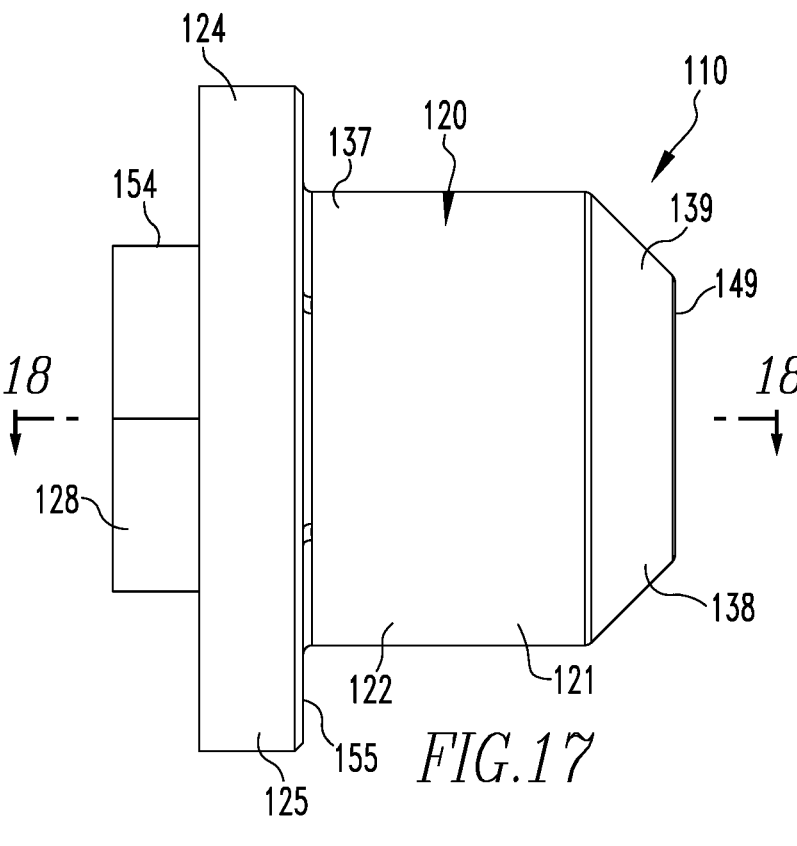
FIG. 17 is a side view of the expansion sleeve and clamping tube of FIG. 16.
Figure 18:
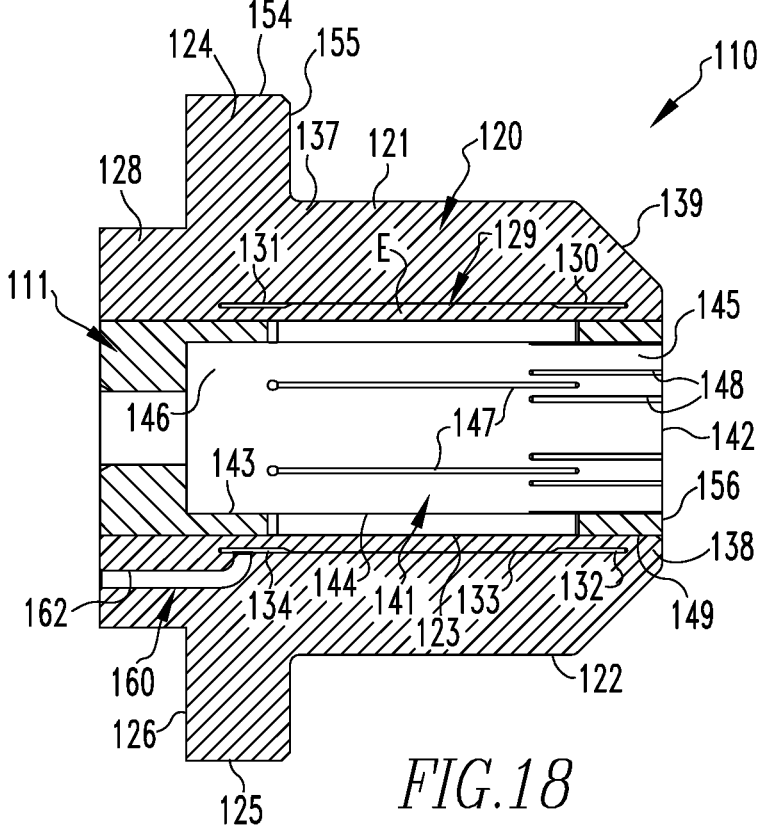
FIG. 18 is a side sectional view taken through line 18-18 of FIG. 17.

FIGS. 16 to 18 illustrate the expansion sleeve 120 and modular clamping tube 141 as part of the hydraulic chuck assembly 110 illustrated in FIGS. 10 to 15. The inner surface 123 of the expansion sleeve 120 defines a central bore 149 along the longitudinal axis. The radial outer surface 122 extends in a radial direction from the front face 155 of the integral flange 124 to the tapered outer surface 139. The tapered outer surface 139 extends from the radial outer surface 122 to the front edge of the sleeve 157. The modular clamping tube 141 comprises a clamping inner surface 143 and a radial outer surface 144. The modular clamping tube 141 has captive slots 147 and open slots 148 extending in an axial direction on the outer surface 144. The open slots 148 extend through the front edge 156 of the modular clamping tube 141 and terminate midway down the outer surface 144 of the tube 141. The captive slots 147 extend in an axial direction and terminate short of the front edge 156 of the tube 141. The clamping tube 141 is housed in the central bore 149. The clamping tube 141 has open slots 148 on the radial outer surface 143 of the clamping tube 141 that extend to the front edge of the clamping tube 156. An integral flange 124 extends radially outward from the outer surface 122 of the expansion sleeve 120 on the axial rearward end 137. The integral flange 124 includes a radial outer surface 125, which defines attachment screw bores 117 for attachment of the sleeve to a tool support member. A torque transfer projection 128 extends radially from a rear face 126 of the integral flange 124 to a rear edge 127 of the torque transfer projection 128. The torque transfer projection 128 comprises an outer surface 154. The expansion sleeve comprises a pressure chamber 129 located between the outer surface 122 and the inner surface 123. A pressurized fluid line 162 is in fluid communication with the pressure chamber 129.

The expansion sleeves, tool support members, clamping tubes, and hydraulic chuck assemblies disclosed herein may be fabricated by any suitable methods, for example, by machining and/or additive manufacturing. As understood by those skilled in the art, "additive manufacturing" refers to processes for forming a three-dimensional object by successively adding material to the object layer by layer. The three-dimensional object may be based upon a 3D model of the component object that may be electronically designed as part of an electronic file having the design parameters.

As used herein, "including," "containing," and like terms are understood in the context of this application to be synonymous with "comprising" and are therefore open-ended and do not exclude the presence of additional undescribed or unrecited elements, materials, phases, or method steps. As used herein, "consisting of" is understood in the context of this application to exclude the presence of any unspecified element, material, phase, or method step. As used herein, "consisting essentially of" is understood in the context of this application to include the specified elements, materials, phases, or method steps, where applicable, and to also include any unspecified elements, materials, phases, or method steps that do not materially affect the basic or novel characteristics of the invention.

For purposes of the description above, it is to be understood that the invention may assume various alternative variations and step sequences except where expressly specified to the contrary. Moreover, all numbers expressing, for example, quantities of ingredients used in the specification and claims, are to be understood as being modified in all instances by the term "about." Accordingly, unless indicated to the contrary, the numerical parameters set forth are approximations that may vary depending upon the desired properties to be obtained by the present invention. At the very least, and not as an attempt to limit the application of the doctrine of equivalents, each numerical parameter should at least be construed in light of the number of reported significant digits and by applying ordinary rounding techniques.

In this application, the use of the singular includes the plural and plural encompasses the singular, unless specifically stated otherwise. In addition, in this application, the use of "or" means "and/or" unless specifically stated otherwise, even though "and/or" may be explicitly used in certain circumstances. In this application, the articles "a," "an," and "the" include plural referents unless expressly and unequivocally limited to one referent.

Whereas particular embodiments of this invention have been described above for purposes of illustration, it will be evident to those skilled in the art that numerous variations of the details of the present invention may be made without departing from the invention as defined in the appended claims.

We claim:
1. A modular hydraulic chuck assembly comprising:
(a) a tool support member;
(b) a hydraulic expansion sleeve extending axially forward from the tool support member and including a central bore;

(c) a torque transfer connection between the tool support member and the expansion sleeve, the torque transfer connection having a non-circular projection and a complementary recess, the projection having an internal circumference contiguous with the central bore, wherein an outer surface of the projection contacts an inner surface of the recess; and (d) a cylindrical inner clamping tube extending axially forward from a front face of the tool support member and disposed at least partially within the central bore of the expansion sleeve.

2. The modular hydraulic chuck assembly of claim 1, wherein the cylindrical inner clamping tube is integral to the tool support member.

3. The modular hydraulic chuck assembly of claim 1, wherein the cylindrical inner clamping tube is separate from and joined to the tool support member.

4. The modular hydraulic chuck assembly of claim 1, wherein the clamping tube comprises at least one slot extending in an axial direction.

5. The modular hydraulic chuck assembly of claim 1, wherein the clamping tube comprises more than one slot extending in an axial direction.

6. The modular hydraulic chuck assembly of claim 5, wherein at least one of the slots comprises an open slot extending through a front edge of the clamping tube.

7. The modular hydraulic chuck assembly of claim 5, wherein the slots comprise a plurality of open slots.

8. The modular hydraulic chuck assembly of claim 5, wherein at least one of the slots comprises a captive slot extending in an axial direction and terminating short of a front edge of the clamping tube.

9. The modular hydraulic chuck assembly of claim 5, wherein the slots comprise a plurality of captive slots that extend in an axial direction and terminate short of a front edge of the clamping tube.

10. The modular hydraulic chuck assembly of claim 5, wherein the slots are equally spaced around a circumference of the clamping tube.

11. The modular hydraulic chuck assembly of claim 1, wherein the inner clamping tube has a wall thickness of 0.25 mm to 5 mm.

12. The modular hydraulic chuck assembly of claim 1, further comprising a pressure chamber extending in an axial direction between an outer surface of the expansion sleeve and an inner surface of the expansion sleeve.

13. The modular hydraulic chuck assembly of claim 12, wherein the pressure chamber comprises:

a generally cylindrical outer radial wall; and a generally cylindrical inner radial wall radially inside and separated from the outer radial wall.

14. The modular hydraulic chuck assembly of claim 13, wherein the hydraulic chuck assembly comprises an elastic wall defined by the inner radial wall of the pressure chamber and the inner surface of the expansion sleeve, wherein the elastic wall has a wall thickness of from 0.5 mm to 5 mm.

15. The modular hydraulic chuck assembly of claim 14, wherein a ratio of the elastic wall thickness to a clamping tube wall thickness is from 0.1:1 to 10:1.

16. The modular hydraulic chuck assembly of claim 15, wherein the pressure chamber has an axial length, the clamping tube has an axial length, and the axial length of the clamping tube is from 50 to 200 percent of the axial length of the pressure chamber.

17. The modular hydraulic chuck assembly of claim 1, wherein the recess of the torque transfer connection is provided on the front face of the tool support member, and the projection of the torque transfer connection is provided on a rear face of the expansion sleeve.

18. The modular hydraulic chuck assembly of claim 1, wherein the expansion sleeve comprises a body with an outer radial surface and also comprises a tapered outer surface extending axially forward from the body.

19. The modular hydraulic chuck assembly of claim 1, wherein the expansion sleeve comprises a flange integrally formed with an outer wall of the expansion sleeve.

* * * * *